United States Patent
Kliebhan et al.

(10) Patent No.: US 9,737,784 B1
(45) Date of Patent: Aug. 22, 2017

(54) AUTOMATED OFFICIATING AND PLAYER DEVELOPMENT SYSTEM FOR SPORTS THAT UTILIZE A NETTED COURT

(71) Applicant: Acculines, LLC, Newtown, PA (US)

(72) Inventors: David Kliebhan, Newtown, PA (US); Andrew Hatstat, Lansdale, PA (US)

(73) Assignee: Acculines, LLC, Newtown, PA (US)

( * ) Notice: Subject to any disclaimer, the term of this patent is extended or adjusted under 35 U.S.C. 154(b) by 748 days.

(21) Appl. No.: 14/102,461

(22) Filed: Dec. 10, 2013

(51) Int. Cl.
*A63B 71/06* (2006.01)

(52) U.S. Cl.
CPC .......... *A63B 71/0605* (2013.01); *A63B 71/06* (2013.01); *A63B 2071/0611* (2013.01)

(58) Field of Classification Search
CPC ................ A63B 2220/89; A63B 24/00; A63B 2024/0025
See application file for complete search history.

(56) References Cited

U.S. PATENT DOCUMENTS

| | | |
|---|---|---|
| 4,664,376 A | 5/1987 | Gray |
| 5,059,944 A * | 10/1991 | Carmona ........... A63B 71/0605 340/323 R |
| 5,138,322 A | 8/1992 | Nuttall |
| 5,489,886 A * | 2/1996 | Wexler ............... A63B 71/0605 340/323 R |
| 5,553,860 A | 9/1996 | Zelikovich |
| 5,800,292 A | 9/1998 | Brace |
| 6,024,658 A | 2/2000 | Marshall |
| 8,246,051 B1 * | 8/2012 | Nygaard ................ A63B 71/06 116/223 |
| 2012/0050458 A1 * | 3/2012 | Mauchly ............ H04N 5/23238 348/14.16 |

FOREIGN PATENT DOCUMENTS

IL    WO 2013124856 A1 *   8/2013   ........... G06T 7/2093

* cited by examiner

*Primary Examiner* — James S McClellan
*Assistant Examiner* — Syvila Weatherford
(74) *Attorney, Agent, or Firm* — LaMorte & Associates, P.C.

(57) ABSTRACT

An automated officiating and player development system for a game played on a court with a net. The system utilizes arrays of optical imaging devices that are positioned near the net and face outwardly toward the two halves of the court. Each of the arrays scan across the court in two scan fields, wherein a first scan field projects across the court in an area below the an elevated second scan field. The second scan field is positioned a few inches above the first scan field. In this manner, any object that contacts the court from above must pass through both the first scan field and the second scan field. Separate arrays of optical detecting devices are positioned along the net. All the arrays produce pixilated images of any object they scan. A processor analyzes the pixilated images to identify the pixilated images of the detected objects.

20 Claims, 5 Drawing Sheets

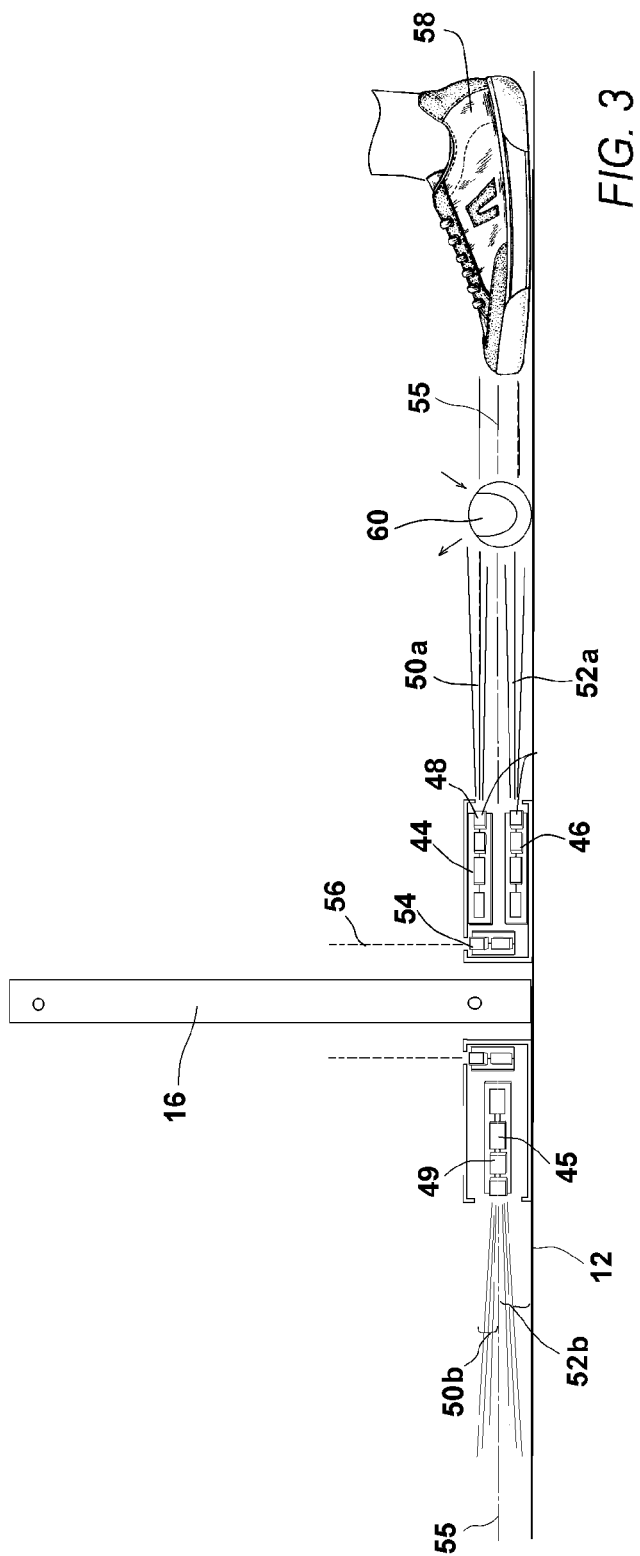
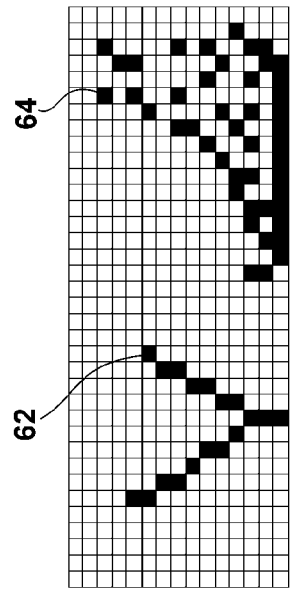
FIG. 3
FIG. 4

US 9,737,784 B1

AUTOMATED OFFICIATING AND PLAYER DEVELOPMENT SYSTEM FOR SPORTS THAT UTILIZE A NETTED COURT

BACKGROUND OF THE INVENTION

1. Field of the Invention

In general, the present invention relates to systems that are used to automatically keep score in a game, such as tennis, that is played on a court with a bisecting net. More particularly, the present invention relates to optical systems that are capable of determining where a ball, shuttlecock, or similar sports projectile strikes the court.

2. Prior Art Description

Many games, such as tennis, volleyball, and badminton, are played on courts that are bisected into two halves by a central net. In all such games, it is the object of the game to propel a ball or shuttlecock over the net and within bounds without allotting an opponent to make a return. When played at a professional level, such games are monitored by one or more umpires. However, in most instances, such games are played for recreation by amateurs. As such, the games are not refereed and the players make their own calls.

Although games like tennis are often played for recreation, that does not mean that the games are not played competitively. In many games, winning and losing matters greatly to the players. Furthermore, making point rulings during the game is often a judgment call where players can disagree. As a consequence, points scored during a game can be contentious. This can lead to player frustration and take way from the fun of playing the game.

It is not practical for recreational players to hire umpires to judge a game. As such, contentious calls are accepted as part of playing the game. An alternative to using real umpires and line judges is to use an automated system. In the prior art, automated systems have been developed that are used to judge points with machine precision. Such systems typically monitor the various bounds of the court with cameras or contact sensors. The data collected by the cameras is analyzed to determine if certain play shots were either in bounds or out of bounds. Such prior art automated systems are exemplified by U.S. Pat. No. 4,664,376 to Gray, U.S. Pat. No. 5,553,860 to Zelikovich, and U.S. Pat. No. 5,800,292 to Brace.

In the prior art, there are more sophisticated automated systems that can not only determine if a shot lands in bounds, but can track a shot no matter where it lands within the court. Such systems typically use multiple arrays of high-speed cameras positioned around the court, so that the position of each shot can be triangulated and tracked. Such systems are exemplified in the prior art by U.S. Pat. No. 5,059,944 to Carmona, U.S. Pat. No. 5,138,322 to Nuttall, U.S. Pat. No. 6,024,658 to Marshall, and U.S. Pat. No. 5,489,886 to Wexler. The advantage of such systems is that they let a player visualize where their shots are landing. This information is useful to players and coaches.

A disadvantage presented by all automated officiating systems in the prior art is that the systems are prohibitively expensive and complex. Systems that use contact sensors require that specialized courts be constructed. Systems that use multiple arrays of high-speed cameras require large capital outlays and extensive calibration by trained technicians. The result is that the costs become so prohibitive, that such systems are only justified at the professional level. Such systems, therefore, are not practical for use on courts utilized by recreational players.

A need therefore exists for an automated officiating system that is practical for use by recreational players, wherein the automated officiating system is inexpensive, easy to install, easy to operate, and easy to maintain. These needs are met by the present invention as described and claimed below.

SUMMARY OF THE INVENTION

The present invention is an automated officiating and player development system for a game played on a court with a net that bisects the court. The system utilizes arrays of optical imaging devices that are positioned near the net and face outwardly toward the two halves of the court. Each of the arrays scan across the court in two scan fields, wherein a first scan field projects across the court in an area below the an elevated second scan field.

The second scan field is positioned a few inches above the first scan field. In this manner, any object, such as a ball, that contacts the court from above must pass through both the first scan field and the second scan field.

Separate arrays of optical detecting devices are positioned along the net to detect when a ball crosses the plane of the net.

All the arrays produce pixilated images of any object they scan. Any object that crosses the net is detected by the net arrays. Any object that contacts the court must pass through both the first scan field and the second scan field. A processor analyzes the pixilated images to identify the pixilated images of the detected objects. The processor also quantifies where on the court the object made contact. Using this information, the processor can analyze events in light of the rules of the game to keep an accurate score.

The system detects the path of the ball as it travels over the net and strikes the court. However, the system also detects the player's positions as they step upon the court. As such, the system can analyze the positions and motions of the players to generate comprehensive statistical and strategic information that is useful for improving player performance.

BRIEF DESCRIPTION OF THE DRAWINGS

For a better understanding of the present invention, reference is made to the following description of an exemplary embodiment thereof, considered in conjunction with the accompanying drawings, in which:

FIG. 3 shows a shoe and ball passing through two of the scan fields generated by the optical arrays in the optical scan assemblies;

FIG. 4 shows a pixilated image corresponding to the scan field shown in FIG. 3;

DETAILED DESCRIPTION OF THE DRAWINGS

Although the present invention automated officiating system can be utilized in a variety of sports, such as volleyball and badminton, the present invention system is especially well suited for use in playing tennis. As such, the embodiment illustrated shows the system being applied to a tennis court. This embodiment is selected in order to set forth the best mode contemplated for the invention. The illustrated embodiment, however, is merely exemplary and should not be considered a limitation when interpreting the scope of the appended claims.

Figure 1:
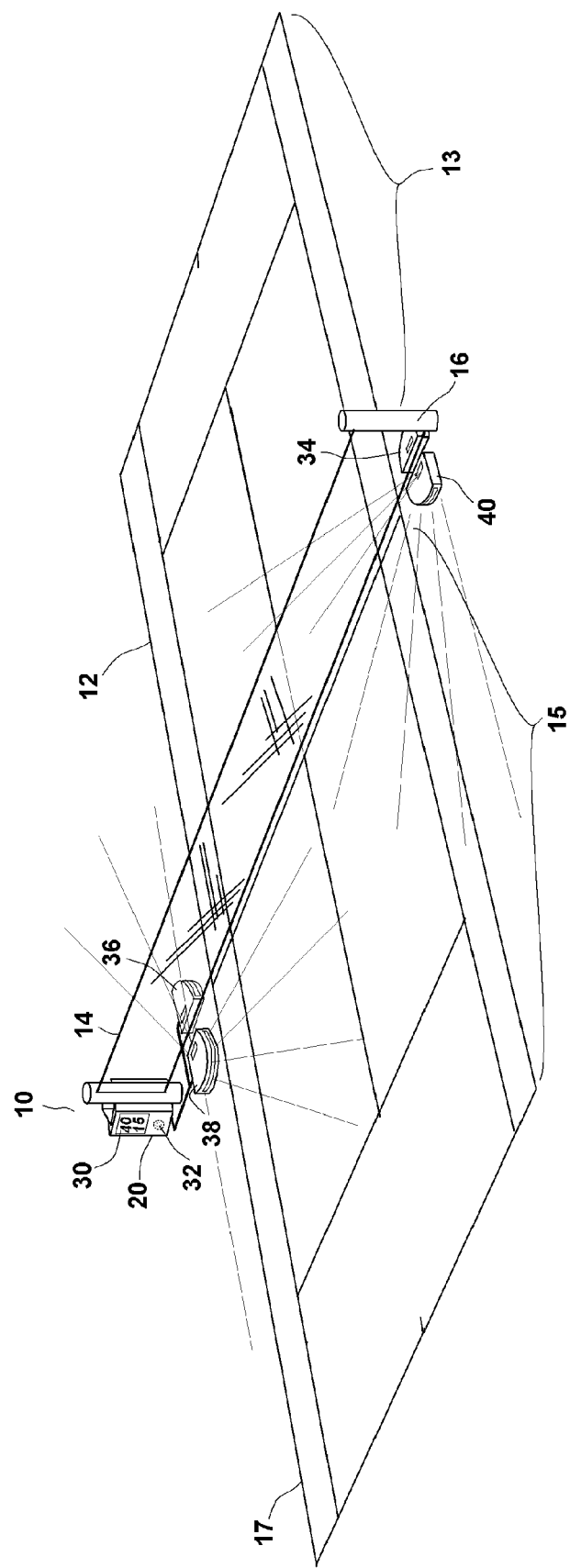
FIG. 1 is a perspective view of an exemplary embodiment of the automated officiating system applied to a tennis court.

In FIG. 1, the automated officiating system 10 is shown installed on a regulation tennis court 12. The tennis court 12 has a central net 14 that divides the tennis court 12 into a backcourt 13 and a frontcourt 15. The net 14 extends across the middle of the tennis court 12 between two anchor posts 16. The anchor posts 16 are out of bounds and lay beyond the long sidelines 17, 18 of the tennis court. Official regulations require that the anchor posts 16 be positioned three feet beyond the sidelines 17, 18.

Figure 2:
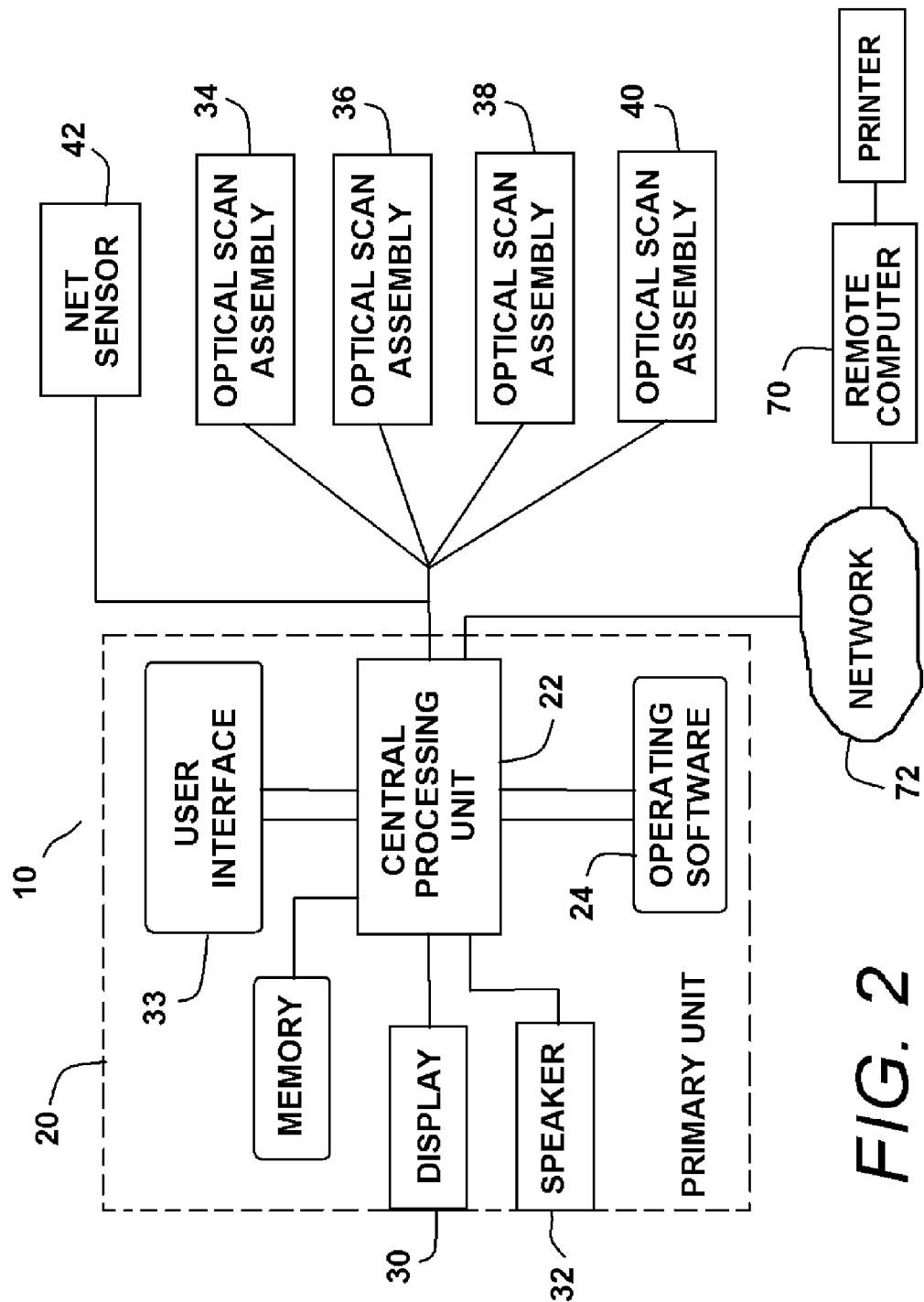
FIG. 2 is a schematic block diagram of the automated officiating system.

Referring to FIG. 1 in conjunction with FIG. 2, it can be seen that the automated officiating system 10 contains a primary unit 20. The primary unit 20 is mounted to one of the anchor posts 16 for the net 14. The primary unit 20 contains the central processing unit (CPU) 22 that runs the operational software 24 for the automated officiating system 10. The primary unit 20 is mounted to one of the anchor posts 16 so that it has a first surface facing the backcourt 13 and a second surface facing the frontcourt 15. Two score displays 30 are provided. The score displays 30 are disposed on the first surface and the second surface. In this manner, the players on the frontcourt 15 and the backcourt 13 can both readily see the score displays 30 by glancing toward the primary unit 20.

The primary unit 20 also contains at least one speaker 32. The speaker 32 transmits sounds toward the frontcourt 15 and the backcourt 13 during play, such as for calling the ball out and announcing the score. The primary unit 20 also contains a user interface 33 that enables the players to activate the automated officiating system 10 and to interact with the operational software 24. The user interface 33 is preferably located on the top of the primary unit 20. The user interface 33 enables players to start, stop, and pause the operational software 24. The user interface 33 also enables players to change scores, reverse calls, and perform other manual overrides to the operational software 24 as needed.

Four optical scan assemblies 34, 36, 38, 40 are provided. The optical scan units 34, 36, 38, 40 are positioned along the net 14 between the anchor posts 16 and the sidelines 17, 18 of the tennis court 12. Two optical scan assemblies 34, 36 are directed toward the backcourt 13. The optical scan assemblies 34, 36 are positioned along the net 14 on opposite sides of the court 12. Likewise, two optical scan assemblies 38, 40 are directed toward the frontcourt 15. The optical scan assemblies 38, 40 are positioned along the net 14 on opposite sides of the court 12. The four optical scan assemblies 34, 36, 38, 40 read data to the CPU 22 in the primary unit 20 for analysis, as will later be explained in more detail.

At least one net sensor 42 is also provided. The net sensor 42 can be vibrational or acoustical in nature and detects when a tennis ball strikes the net 14. The net sensor 42 also reads data to the CPU 22 in the primary unit 20.

Referring to FIG. 3 in conjunction with FIG. 1 and FIG. 2, it can be seen that inside each of the optical scan assemblies 34, 36, 38, 40 are optical arrays 45. In FIG. 3, two of the optical scan assemblies 34, 40 are shown. In each of the optical scan assemblies 36, 38, a different type of optical array is presented. The use of different optical array types is for descriptive purposes only. It will be understood that when sold, the various optical scan assemblies 34, 36, 38, 40 will contain the same type of optical arrays 45.

In the first optical scan assembly 36, two horizontal arrays 44, 46 are utilized. The horizontal arrays 44, 46 are arrays of imaging devices 48, such as CCD image sensors and/or CMOS cameras. Each imaging device preferably has a resolution of at least 10 megapixels. Each of the horizontal arrays 44, 46 is capable of imaging a scan field in a horizontal plane that extends at least 90 degrees from the plane of the net to just beyond one of the sidelines 17, 18. The upper horizontal array 44 produces an upper scan field 50(a). The lower horizontal array 46 produces a lower scan field 52(a). The upper scan field 50 (a) and the lower scan field 52(a) are divided by an imaginary plane 55. The upper scan field 50(a) scans above the imaginary field 55 and the lower scan field scan below the imaginary plane 55. Both the upper scan field 50(a) and the lower scan field 52(b) are directed in planes, above and below the imaginary plane 55, that are parallel to the plane of the tennis court 12.

In the second optical scan assembly 40, a single horizontal array 47 is utilized. The imaging devices 48 on the horizontal array 47 are capable of imaging a scan field 49 that diverges above and below a central imaginary plane 55. The scan field 49 above the imaginary plane 55 is utilized as an upper scan field 50(b). The scan field 49 below the imaginary plane 55 is utilized as a lower scan field 52(b).

Each of the optical scan assemblies 34, 36, 38, 40 also contains a vertical array 54 of image sensors. The vertical array 54 images a vertical scan field 56 that is parallel to the plane of the net 14.

Referring to FIG. 3 and FIG. 4 in conjunction with FIG. 1, it can be seen that the upper scan field 50(a), 50(b) and the lower scan field 52(a), 52(b) both project across the surface of the tennis court 12. The lower scan field 52(a), 52(b) is generally directed in a first area below the imaginary plane 55 that is no greater than three inches above the surface of the tennis court 12. The upper scan field 50(a), 50(b) is generally directed in a second plane, above the imaginary plane, that is between two and six inches above the first plane.

It will be understood that any object that contacts the tennis court 12 from above will pass through both the upper scan field 50(a), 50(b) and the lower scan field 52(a), 52(b). The most common objects that touch the court during a game are a player's shoe 58 and the tennis ball 60. As a tennis ball 60 contacts the court 12 it is imaged in both the upper scan field 50(a) and the lower scan field 50(b), respectively. In both the upper and lower scan fields, the tennis ball 60 is perceived as a pixilated image 62. The pixilated image 62 of the tennis ball 60 in play has certain unique characteristics. These characteristics include the size of the pixilated image 62, the colors of the pixilated image 62, the duration of the pixilated image 62, and the pixel pattern embodied by the pixilated image 62. As such, the pixilated image of a tennis ball 60 in play has a certain digital fingerprint that identifies it as a tennis ball in play. In FIG. 3 and FIG. 4, it can be seen that a player's shoe 58 is also imaged as it passes along the tennis court 12. However, the pixilated image 64 produced by the shoe 58 is readily distinguishable from the pixilated image 62 of the tennis ball 60.

All pixilated images are analyzed by the CPU 22 in real time. The pixilated images are compared to the various image criteria indicative of a tennis ball and a player's shoe. Once a pixilated image 62 of a tennis ball 60 contacting the tennis court 12 is identified, the location of that contact is calculated. The position of the contact is then analyzed by the CPU 22 to determine if the point of contact was in bounds and was proper under the rules of the game.

The point of contact with the court is saved for future reference by the player. Optionally, the position of the player's shoes 58 can also be calculated and saved. In this manner, a player can later reference his/her position on the tennis court 12 when a point was made or lost.

Figure 5:
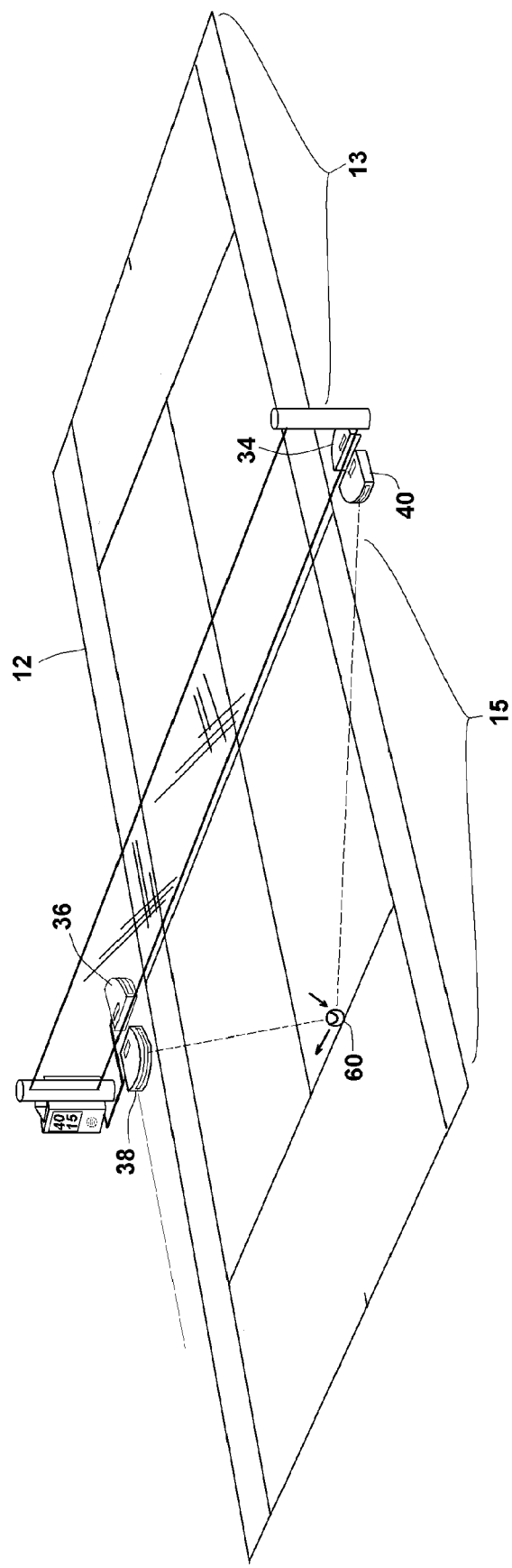
FIG. 5 shows two optical scan assemblies being used to triangulate the position of court impact.

Referring to FIG. 5 in conjunction with FIG. 3, it will be understood that the scan fields of the various optical scan assemblies 34, 36, 38, 40 observes the court as well as the plane of the net 14. As the tennis ball 60 contacts the court 12 or crosses the net 14 it is imaged. The exact position of the tennis ball 60 can be calculated by triangulating the pixilated images generated by the vertical arrays 54 on opposite sides of the tennis court 12. In this manner, the system can analyze the position and motion of each player on the tennis court 12 for every shot that was attempted. A statistics report can then be assembled for each player at the completion of their match. The report is capable of providing a comprehensive set of performance statistics related to each player's consistency, power, placement, strategy, fitness, and mental toughness. Optionally, the system can interpret these statistics and provide real-time coaching information to each player as the match progresses. For example, the coaching suggestions can be transmitted as text messages to each player's cellphone.

It should be further noted that the plane of the net 14 is observed on both sides of the net 14. In the backcourt 13, the plane of the net 14 is observed by optical scan assemblies 34, 36. In the frontcourt 15, the plane of the net 14 is observed by optical scan assemblies 38, 40. Thus, the position of the tennis ball 60 can be calculated on both sides of the net 14. This double detection enables both the speed and trajectory of the tennis ball 60 to be calculated as it passes over the net 14.

Since the automated officiating system 10 requires only the primary unit 20, the four optical scan assemblies 34, 36, 38, 40 and the net sensor 42 to be installed onto a tennis court 12, the installation process for installing the automated officiating system 10 can be done very rapidly and inexpensively. Furthermore, since the optical scan assemblies 34, 36, 38, 40 use low cost imaging devices in place of high speed cameras, the present invention system 10 is far less expensive than prior art systems. This enables the automated officiating system 10 to be installed in local tennis clubs, health clubs and other places where recreational players typically play.

Figure 6:
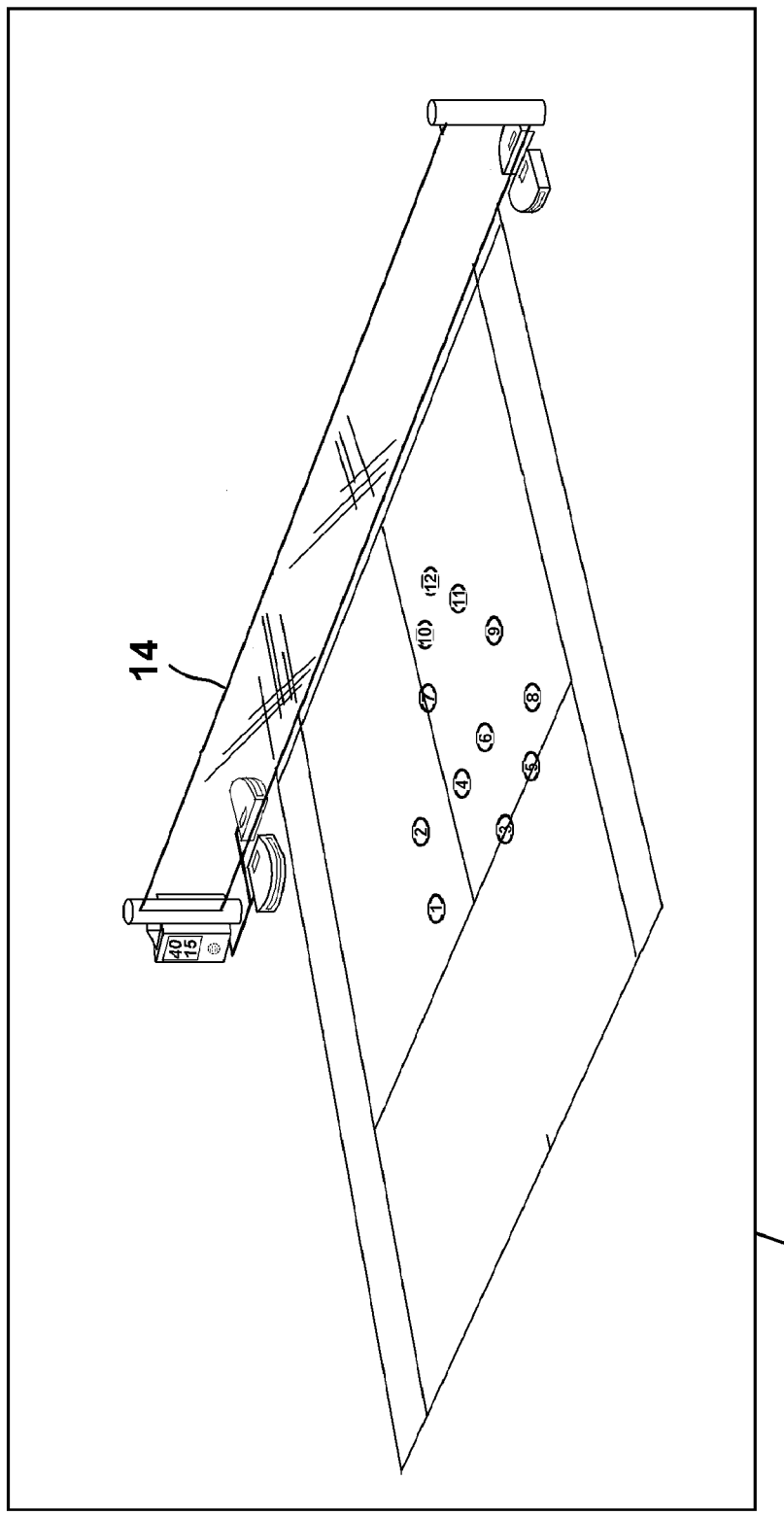
FIG. 6 shows an exemplary image from an optional player evaluation report generated by the automated officiating system.

Returning to FIG. 2, it can be seen that the CPU 22 in the primary unit 20 can be linked to an external computer 70 either directly or through a network 72 like the World Wide Web or a cellular network. The data of where the tennis ball landed and where the players step can be downloaded as a report for any game or any part of a game. That data can be used in simulation software to recreate play long after play has ended. For instance, referring to FIG. 6, a display 74 can be generated that shows where all the various serves landed for a particular player. Similar displays can be shown for returns, volleys, and the like. For each shot that passes over the net 14, the player can recall shot type, placement, net clearance, line clearance, and velocity. Such information can help a person play better and help a coach instruct better.

Additionally, a player can video tape a game or any part of the game. The system can then synchronize the video tape to the data collected by the officiating system. Using a timestamp, the video can be chopped up into video clips and stored in a database indexed to everything known about a particular shot, such as in/out, velocity, backhand, forehand, etc. A coach can then review the video clips in a very efficient manner. A coach can look at every backhand hit wide, for example, to detect any systematic errors that the player is making with their swing or footwork. This analysis can be presented on a tablet computer or smart phone reviewed with the player at a later time. It enables a tennis club and coach to bring in additional revenue via a package deal. And, player gets to see how they actually perform during real match, not just during lesson time.

It will be understood that the embodiment of the present invention that is illustrated and described is merely exemplary and that a person skilled in the art can make many variations to that embodiments. All such embodiments are intended to be included within the scope of the present invention as defined by the claims.

What is claimed is:

1. An automated officiating system for a game played on a court with a net, said system comprising:
a plurality of optical scan assemblies, each of said optical scan assemblies containing at least one array of imaging devices that image both a first scan field and a second scan field over a section of the court, wherein said first scan field and said second scan field are parallel and extend at least 90 degrees in planes that are parallel to said section of the court, wherein said first scan field and said second scan field are at different elevations above said section of the court, and wherein said at least one array produces pixilated images of any object that contacts said section of the court by passing through said first scan field and said second scan field; and
a processor that analyzes said pixilated images to identify said object that contacts said section of the court and quantifies where on said section of the court said object made contact.

2. The system according to claim 1, wherein said first scan field is less than three inches above said court.

3. The system according to claim 2, wherein said second scan field is between two inches and six inches above said first scan field.

4. The system according to claim 1, wherein said net on said court divides said court into a backcourt and a frontcourt, wherein said optical scan assemblies are all positioned proximate said net.

5. The system according to claim 4, wherein said optical scan assemblies include two optical scan units directed toward said backcourt and two optical scan units directed toward said frontcourt.

6. The system according to claim 5, wherein each of said optical scan assemblies includes a third array of imaging devices that images a third scan field that is perpendicular to both said first scan field and said second scan field.

7. The system according to claim 1, further including at least one score display operated by said processor.

8. The system according to claim 5, further including a first display facing said frontcourt and a second display facing said backcourt.

9. The system according to claim 7, further including a user interface for interacting with said processor.

10. The system according to claim 9, wherein said processor and said interface are housed in a unit that is mounted in a fixed position proximate said net.

11. The system according to claim 10, wherein said at least one score display is housed in said unit.

12. The system according to claim 1, further including a net contact sensor that is attached to said net, wherein said net contact sensor electronically communicates with said processor.

13. A system comprising:
- a court having a frontcourt section, a backcourt section and sidelines;
- a net suspended between posts, wherein said net extends across said court between said frontcourt section and said backcourt section;
- arrays of optical imaging devices positioned proximate said posts, wherein each of said arrays images both a first scan field and a second scan field that extend at least 90 degrees over said court from said net to said sidelines in planes that are parallel to said court, wherein said second scan field is positioned above said first scan field, and
- wherein each said array produces data corresponding to objects that move within said first scan field and said second scan field;
- a processor that analyzes said data to identify said objects and to locate said objects on said court anywhere within said first scan field and said second scan field.

14. The system according to claim 13, wherein said first plane is less than three inches above said court.

15. The system according to claim 14, wherein said second plane is between two inches and six inches above said first plane.

16. The system according to claim 13, wherein each of said arrays includes a third array of image sensors having a third scan field that progresses along a third plane that is perpendicular to both said first plane and said second plane.

17. The system according to claim 13, further including at least one score display operated by said processor.

18. The system according to claim 13, further including a first display facing said frontcourt and a second display facing said backcourt.

19. The system according to claim 18, further including a user interface for interacting with said processor.

20. The system according to claim 19, wherein said processor and said interface are housed in a unit that is mounted in a fixed position on one of said posts.

* * * * *